United States Patent
Tonio et al.

(10) Patent No.: US 12,518,253 B2
(45) Date of Patent: Jan. 6, 2026

(54) SYSTEM AND METHOD FOR E-RECEIPT PLATFORM

(71) Applicant: ROYAL BANK OF CANADA, Montreal (CA)

(72) Inventors: Arun Tonio, Toronto (CA); Dileep Kumar, Toronto (CA); Shuvradipta Saha, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 0 days.

(21) Appl. No.: 16/196,902

(22) Filed: Nov. 20, 2018

(65) Prior Publication Data

US 2019/0156302 A1 May 23, 2019

Related U.S. Application Data

(60) Provisional application No. 62/588,757, filed on Nov. 20, 2017.

(51) Int. Cl.
| | |
|---|---|
| *G06Q 20/04* | (2012.01) |
| *G06F 21/31* | (2013.01) |
| *G06Q 20/20* | (2012.01) |
| *G06Q 20/40* | (2012.01) |

(52) U.S. Cl.
CPC .......... *G06Q 20/047* (2020.05); *G06F 21/31* (2013.01); *G06Q 20/209* (2013.01); *G06Q 20/40* (2013.01)

(58) Field of Classification Search
CPC .... G06Q 20/047; G06Q 20/209; G06Q 20/20; G06Q 30/04; G06Q 20/12; G06Q 20/40
See application file for complete search history.

(56) References Cited

U.S. PATENT DOCUMENTS

| | | | | |
|---|---|---|---|---|
| 7,552,087 B2* | 6/2009 | Schultz | ............... | G06Q 40/025 |
| | | | | 705/39 |
| 9,009,844 B1* | 4/2015 | Corn | ..................... | H04L 9/3271 |
| | | | | 726/17 |
| 9,646,291 B2* | 5/2017 | Britt | ....................... | G06Q 30/06 |
| 9,781,204 B2* | 10/2017 | Martin | .................... | G06F 16/27 |
| 9,961,088 B2* | 5/2018 | Hughes, Jr. | ............. | H04L 63/08 |
| 2004/0098350 A1* | 5/2004 | Labrou | .............. | G06Q 20/3674 |
| | | | | 705/64 |
| 2010/0100434 A1* | 4/2010 | Sock | .................... | G06Q 20/202 |
| | | | | 705/14.38 |

(Continued)

OTHER PUBLICATIONS

Yusaf Albayram et al. (2016). Evaluating smartphone-based dynamic security questions for fallback authentication: a field study. Human-centric Computing and Information Sciences. (Year: 2016).*

*Primary Examiner* — Peter Ludwig
(74) *Attorney, Agent, or Firm* — Norton Rose Fulbright Canada LLP

(57) ABSTRACT

Embodiments described herein provide a platform, device and process for storing transaction data from a point of sale device (e.g., at a merchant) or from an intermediary data store so a representation of the data can later be presented to a customer. The data is stored, relevant data extracted, and additional data is combined to enable reconstruction of transaction data in a form for presentation of transaction data as an e-receipt on an online platform or allowing transaction data to be used as security questions for a user to whom the transaction data relates.

20 Claims, 14 Drawing Sheets

(56) References Cited

U.S. PATENT DOCUMENTS

| | | | |
|---|---|---|---|
| 2013/0191898 A1* | 7/2013 | Kraft | G06F 21/31 |
| | | | 726/6 |
| 2013/0318580 A1* | 11/2013 | Gudlavenkatasiva | |
| | | | H04L 63/168 |
| | | | 726/7 |
| 2014/0337150 A1* | 11/2014 | Anand | G06Q 20/045 |
| | | | 705/16 |
| 2015/0206111 A1 | 7/2015 | Sugiyama | |
| 2017/0177881 A1* | 6/2017 | Krishna | H04L 63/20 |
| 2017/0193463 A1* | 7/2017 | Britt | G06Q 20/20 |
| 2017/0331824 A1* | 11/2017 | Pender | H04L 63/0892 |
| 2018/0181951 A1* | 6/2018 | Goldfinger | G07G 1/14 |
| 2018/0211237 A1* | 7/2018 | Subbaiya | G06F 3/1219 |

\* cited by examiner

The problems we face presently...

Customers use different channels to purchase items.
Where to find my old bills which I need at some point ??

```
{
    "receipt_info": {
        "merchant_name": "Walmart",
        "store_address": "Wal-Mart Canada Corp., 1940 Argentia Road, Mississauga, ON  L5N 1P9",
        "invoice_details": {
            "invoice_number": "0047",
            "invoice_date": "August 15, 2017"
        },
        "customer_details": {
            "name": "Timothy J. Sabb",
            "customer_address": "230 Queens Quay West, Toronto, ON M5J 2Y7",
            "email": "abc.def@gmail.com"
        },
        "purchase_details": {
            "item_details": [
                {
                    "item_seq": "1",
                    "item_description": "Mobile Card Reader for iPhone and iPad",
                    "quantity": "2",
                    "item_unit_cost": "$19",
                    "line_total":"$38"
                },
                {
                    "item_seq": "2",
                    "item_description": "Wireless Speaker",
                    "quantity": "1",
                    "item_unit_cost": "$70",
                    "line_total":"$70"
                }
            ]
        },
        "transaction_details": {
            "subtotal":"$108",
            "tax":"13%",
            "total":"$122.04",
            "mode_payment": "Cash"
        }
    }
}
```

FIG. 12

| Type of question | Example |
|---|---|
| From which shop | From which shop did you buy your new shoes?<br>Options: Adidas / Puma / Nike |
| When | When was your latest shopping at Costco?<br>Options: Friday / Saturday / Sunday |
| Which Item | What did you recently buy from the Bay?<br>Options: Pants / Shirt / Bag |
| How many Items | How many chocolate boxes did you by from No Frills last week?<br>Options: 1/2/3 |
| Which Brand | Which brand of cereals did you buy from Loblaws yesterday?<br>Kellogg's / Cheerios / Nature's path |
| Location | From which Canadian tire location did you buy Barbeque grill last month?<br>Toronto / Mississauga / Oakville |

FIG. 13

SYSTEM AND METHOD FOR E-RECEIPT PLATFORM

CROSS-REFERENCE

This application claims the benefit of and priority to U.S. provisional patent application No. 62/588,757 filed on Nov. 20, 2017, the entire content of which is herein incorporated by reference.

FIELD

The present disclosure generally relates to the field of generating electronic record storage and retrieval systems and particularly to systems and methods for e-receipt or authentication platforms.

INTRODUCTION

Merchants transact with customers at a point of sale device. Customers increasingly use electronic means of payment accessible via a mobile device. These customers are given the convenience of not carrying anything other than their mobile devices to complete a transaction. Other customers choose to save themselves the trouble of carrying and keeping track of physical receipts evidencing their transactions. However, customers may later need receipts evidencing their transactions with different merchants, for example, when requesting exchange or refund, disputing an amount charged, keeping track of a budget, or verifying a credit card bill for accuracy.

Merchants often have their own checkout process, and merchants update their inventories, track purchases, and so on. This information may be useful if stored and combined with information received at a financial institution, for example, as the user may wish to be able to view or utilize the transaction information in the future (e.g., as an improved e-Receipt). However, the systems are often silo-ed and disparate, and further, many merchant point of sale devices are archaic and not designed for interoperation.

There is a need for facilitating collection and storage of transaction data and its electronic regeneration so as to bring convenience to customers who do not carry or keep physical receipts from multiple different merchants or different channels/marketplaces. The storage and regeneration of the data can is also helpful in relation to account security and verification. A technical approach is described that provides an improved data architecture that, in some embodiments, utilizes a data structure driven mechanism to provide populated intermediate data storage.

SUMMARY

Specific technical improvements are described herein that describe configured computers and data architectures that are programmed to interoperate between merchant terminals and user devices to provision and generate electronic receipts or other indicia of transaction information. In some embodiments, the configured computers are adapted to maintain, or otherwise store, in adapted data structures, the transaction information such that it is readily available and accessible for downstream data processing, including, but not limited to, automated extraction of transaction information, pattern recognition, automated fraud estimation, among others.

The system is configured as a trusted intermediary between the user, the financial institution, and the merchant. The system may request data sets from computing systems associated with each party to verify and validate transaction information, user identity, merchant identity, rewards programs, etc. Upon validation and/or verification, the data structures are updated and maintained (e.g., in the form of populated data warehouses).

The transaction information in the data structures may be used to re-generate receipts on demand, or for supporting data analytics. When receipts are re-generated, the system is configured to maintain merchant relationships such that logos, brandings, formatting remain consistent in a re-generated receipt. Further, additional safety and security features may be implemented to establish the veracity of a re-generated receipt (e.g., so that it becomes more difficult to generate fraudulent receipts). Security features, for example, may include one-time codes, watermarks, etc. These security features may be driven by merchant preferences, or in some embodiments, dynamically generated by the system on a receipt by receipt basis.

A platform, device and process is described for storing transaction data from a point of sale device (e.g., at a merchant terminal, cash register, card reader) or from an intermediary data store so a representation of the data can later be presented to a customer. The data is stored, relevant data is extracted, and additional data is combined to enable reconstruction of transaction data in a form allowing presentation of transaction data as an e-receipt on an online platform or allowing transaction data to be used as security questions for a user to whom the transaction data relates. Privacy is a consideration as there may be sensitive information stored within the transaction data.

In accordance with one aspect, there is provided a process for managing transaction data comprising receiving transaction data from one or more data stores, processing the transaction data, and storing or transmitting the transaction data, wherein the stored or transmitted data can be used to generate a presentation of the transaction data.

In accordance with one aspect, there is provided a process wherein the one or more data stores are at a merchant terminal or at a server. In accordance with one aspect, there is provided a process wherein the transaction data is in a first or subsequent set of messages originating from a merchant terminal. In accordance with one aspect, there is provided a process wherein the processing includes extracting data relevant for generating a display or interface element. In accordance with one aspect, there is provided a process wherein the storing includes storing data relevant for generating a display or interface element. In accordance with one aspect, there is provided a process wherein the transaction data or data generated from the transaction data is used to generate a display or displays or an interface element or interface elements. In accordance with one aspect, there is provided a process wherein the display or interface element includes a receipt with one or more data elements derived from the transaction data, such as transaction date, transaction parties, or consideration exchanged. In accordance with one aspect, there is provided a process wherein the processing includes extracting data relevant for generating security questions for authenticating a user, such as a party to the transaction.

In accordance with one aspect, there is provided a process wherein the processing includes associating the transaction data to a user. In accordance with one aspect, there is provided a process wherein the generation of a display or displays or an interface element or interface elements is in response to a request to generate same.

In accordance with one aspect, there is provided a computer-network implemented method for processing transaction data to generate an electronic receipt for a transaction, the method may include: receiving one or more data sets representing transaction data of a transaction, from one or more data stores associated with one or more point of sale computing devices, the transaction data including at least a transaction ID; processing the one or more data sets to extract the transaction data and to generate one or more associations between the transaction data, a merchant identifier corresponding with the point of sale computing device and one or more financial statement records stored at a financial institution computing system; maintaining an enhanced data structure storing the one or more financial statement records enhanced with the transaction data based on the one or more generated associations between the transaction data and the one or more financial statement records; and responsive to a received signal indicative of a request to view an electronic receipt, automatically generating: the electronic receipt based on the transaction ID and the enhanced data structure, and an electronic command for a display of an interface device to render presentation of the electronic receipt.

In some embodiments, the one or more data stores may be maintained by the one or more point of sale computing devices.

In some embodiments, the method may include populating the enhanced data structure with merchant formatting preferences, and wherein generating of the electronic receipt comprises traversing the enhanced data structure and configuring visual presentment in accordance with the merchant formatting preferences.

In some embodiments, the merchant formatting preferences comprise at least one of: associated branding images, visual element sizing, and visual element positioning.

In some embodiments, the method may include populating the enhanced data structure with user formatting preferences, and wherein generating of the electronic receipt comprises traversing the enhanced data structure and configuring visual presentment in accordance with the user formatting preferences.

In some embodiments, the method may include generating one or more security questions for authentication of a user based at least on the enhanced data structure and the transaction data.

In some embodiments, at least one of the one or more security questions is based is generated only when a timestamp of the transaction data indicates that a time period between the timestamp of the transaction data and a current timestamp is within a specified duration.

In accordance with another aspect, there is provided a computer-network implemented method for processing transaction data to generate an electronic receipt for a transaction, the method may include: receiving an image of a receipt containing one or more data sets representing transaction data of a transaction, from a remote device associated with a user, the transaction data including at least a transaction ID; processing the image of the receipt to extract the transaction data and to generate one or more associations between the transaction data, the transaction ID, a merchant identifier corresponding with a point of sale computing device and one or more financial statement records stored at a financial institution computing system; maintaining an enhanced data structure storing the one or more financial statement records enhanced with the transaction data based on the one or more generated associations between the transaction data and the one or more financial statement records; and responsive to a received signal indicative of a request to view an electronic receipt, automatically generating: the electronic receipt based on the transaction ID and the enhanced data structure, and an electronic command for a display of an interface device to render presentation of the electronic receipt.

In some embodiments, the method may include populating the enhanced data structure with merchant formatting preferences, and wherein generating of the electronic receipt comprises traversing the enhanced data structure and configuring visual presentment in accordance with the merchant formatting preferences.

In some embodiments, the merchant formatting preferences comprise at least one of: associated branding images, visual element sizing, and visual element positioning.

In some embodiments, the method may include populating the enhanced data structure with user formatting preferences, and wherein generating of the electronic receipt comprises traversing the enhanced data structure and configuring visual presentment in accordance with the user formatting preferences.

In some embodiments, the method may include generating one or more security questions for authentication of a user based at least on the enhanced data structure and the transaction data.

In some embodiments, at least one of the one or more security questions is based is generated only when a timestamp of the transaction data indicates that a time period between the timestamp of the transaction data and a current timestamp is within a specified duration.

In accordance with yet another aspect, there is provided a computer system for processing transaction data to generate an electronic receipt for a transaction, the system may include a processor and a non-transitory computer-readable medium having machine readable instructions stored thereon, the instructions, when executed, configures the processor to: receive one or more data sets representing transaction data of a transaction, from one or more data stores associated with one or more point of sale computing devices, the transaction data including at least a transaction ID; process the one or more data sets to extract the transaction data and to generate one or more associations between the transaction data, a merchant identifier corresponding with the point of sale computing device and one or more financial statement records stored at a financial institution computing system; maintain an enhanced data structure storing the one or more financial statement records enhanced with the transaction data based on the one or more generated associations between the transaction data and the one or more financial statement records; and responsive to a received signal indicative of a request to view an electronic receipt, automatically generate: the electronic receipt based on the transaction ID and the enhanced data structure, and an electronic command for a display of an interface device to render presentation of the electronic receipt.

In some embodiments, the one or more data stores are maintained by the one or more point of sale computing devices.

In some embodiments, the processor is further configured to populate the enhanced data structure with merchant formatting preferences, and wherein generating of the electronic receipt comprises traversing the enhanced data structure and configuring visual presentment in accordance with the merchant formatting preferences.

In some embodiments, the processor is further configured to populate the enhanced data structure with user formatting preferences, and wherein the generating of the electronic receipt comprises traversing the enhanced data structure and configuring visual presentment in accordance with the user formatting preferences.

In some embodiments, the merchant formatting preferences comprise at least one of: associated branding images, visual element sizing, and visual element positioning.

In some embodiments, the processor is further configured to generate one or more security questions for authentication of a user based at least on the enhanced data structure and the transaction data.

In some embodiments, at least one of the one or more security questions is based is generated only when a timestamp of the transaction data indicates that a time period between the timestamp of the transaction data and a current timestamp is within a specified duration.

In accordance with still another aspect, a computer implemented method is provided for processing transaction data to enhance transaction record data structures, the method including receiving one or more data sets representing transaction data from one or more data stores associated with one or more point of sale computing devices, the transaction data including at least one of product identifiers and service identifiers; processing the one or more data sets to extract the transaction data and to generate one or more associations between the transaction data, a merchant identifier corresponding with the point of sale computing device and one or more financial statement records stored at a financial institution computing system; maintaining an enhanced data structure storing the one or more financial statement records enhanced with the transaction data based on the one or more generated associations between the transaction data and the one or more financial statement records; and responsive to a received signal indicative of a request to view an electronic receipt, automatically regenerating an electronic receipt based on the enhanced data structure and controlling a display of an interface device to render presentation of the electronic receipt.

In accordance with another aspect, the one or more data stores are maintained by the one or more point of sale computing devices.

In accordance with another aspect, the method includes populating the enhanced data structure with merchant formatting preferences, and wherein the regenerating of the electronic receipt includes traversing the enhanced data structure and configuring visual presentment in accordance with the merchant formatting preferences.

In accordance with another aspect, the merchant formatting preferences include at least one of associated branding images, visual element sizing, and visual element positioning.

In accordance with another aspect, the method includes generating one or more security questions for authentication of the user based at least on the enhanced data structure.

In accordance with another aspect, the method is performed on a computing device of a printer configured for electronic communication with the financial institution computing system.

In accordance with another aspect, a printer coupled with at least one of the one or more point of sale devices is configured to provide the one or more one or more data sets representing transaction data from the one or more data stores.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 12 is a depiction of an example data structure for transaction data transmitted from a merchant to a transaction platform or intermediary server; and FIG. 13 is an illustration illustrating example security questions derived from transaction data and can be used for authentication.

DETAILED DESCRIPTION

A platform, device and process is described for storing transaction data from a point of sale device (e.g., at a merchant terminal, cash register, card reader) or from an intermediary data store so a representation of the data can later be presented to a customer. The data is stored, relevant data is extracted, and additional data is combined to enable reconstruction of transaction data in a form allowing presentation of transaction data as an e-receipt on an online platform or allowing transaction data to be used as security questions for a user to whom the transaction data relates.

Privacy is a consideration as there may be sensitive information stored within the transaction data. Embodiments described herein provide a platform, device and process for generating electronic transaction details for storage or presentation using an interface element. In particular, embodiments described herein can provide electronic transaction details for e-receipts or authentication.

Figure 1:
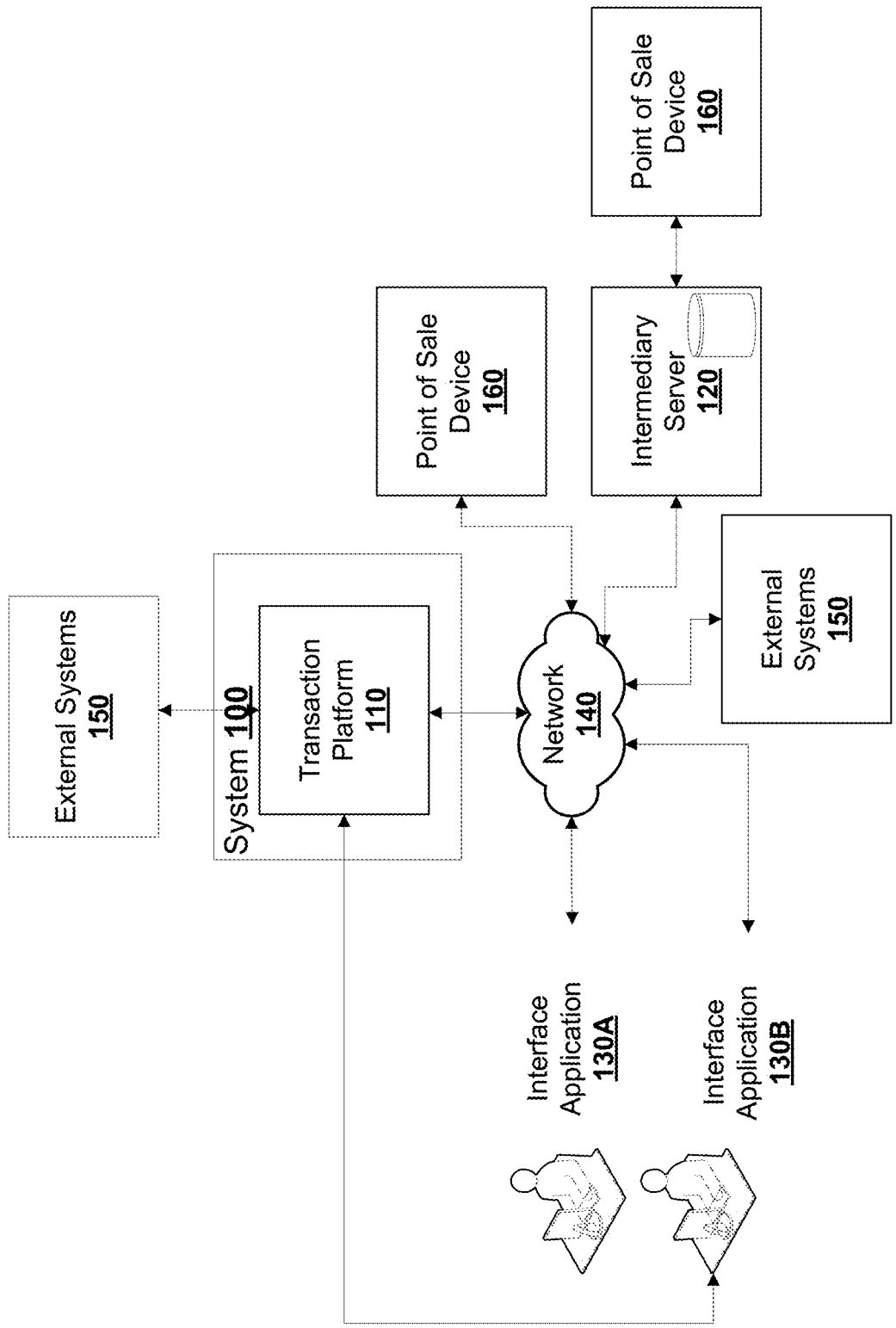
FIG. 1 is a view of an example of an example transaction system according to some embodiments.

FIG. 1 is a block schematic of an example transaction system 100 according to some embodiments. The transaction system 100 is configured to maintain, on a data backend, a data structure that stores data sets generated from transactions.

The data structures, relative to typical listings of transaction information from credit or debit statements, are enhanced with additional information indicative of transaction details, for example, as provided by a point of sale system so that there is more information than simply a transaction value and date. The data structure includes record fields storing information including at least purchase date, an inventory/product/service identifier, among others. In some embodiments, the record fields may be expanded to store information such as warranty information (e.g., warranty expiry period, type of coverage), product configuration (e.g., amount of RAM purchased), tax invoice information (e.g., tax registration number), discounts, adjustments, credits, rewards program enrollments, among others. The data structures maintain information that can, for example, otherwise be stored on store receipts.

The additional information is received by way of data sets communicated across a network 140 by the point of sale device 160, or indirectly from the point of sale device 160 through an intermediary server 120. For example, intermediary server 120 may be useful where the point of sale device 160 cannot be independently configured to provide the data set for enhancement (e.g., a hard coded cash register may require an additional software or hardware intermediary for interoperation).

The data structures are configured for future traversal on either an individual or aggregate level, for example, in response to a user submitting a request to review an earlier transaction, or a review of multiple transactions. Online transactions relating to accounts associated with banks and other financial institutions may already have electronic records, and in some embodiments, the data structures maintained by the transaction system 100 are periodically transformed and/or loaded into data warehouses. In some instances, the data structures are configured to include additional values, rows or columns directed to maintaining additional tagged information that can be utilized as a key for sorting, searching, etc. For example, the additional values, rows or columns may be structure to store enhancements such as a Boolean flag value indicative of potential fraud, a geolocation tag, encryption hash codes as unique identifiers, etc.

Transaction system 100 is implemented using one or more networked computing devices and includes configured processors and memory storing machine readable instructions. Transaction system 100 includes transaction platform 110, and transaction platform 110 is configured for receiving data sets from the point of sales devices, directly or indirectly.

Transaction platform 110 is further configured for coupling with user devices, generating instructions to control the user devices to render visual interface elements that are adapted to request information or approval from a user of the user devices. In particular, transaction platform 110 is configured for electronic communication with interface application 130A and 130B, for example, to engage a user with banking or transaction information or to gather data from the user. Prior transaction details, for example, can be utilized to validate a user during login, etc., and the information may be utilized as a potential additional layer of security for authenticating or authorizing future transactions.

For example, interface applications 130A and 130B are configured to render display interfaces configured for presenting visual display components adapted for receiving data sets directed to user authentication and access. When an approval is received by the system 100, the system 100 is configured to request, retrieve or otherwise obtain data sets representing connection points to interface with the user's banking or credit card account. The account information may be stored at, managed in, and transmitted from transaction platform 110.

Transaction platform 110 can connect to interface application 130 to cause one or more questions to be presented to a user engaged at interface application 130 and to receive one or more responses to questions or other data input from the user. The questions may be used for authentication or other types of identity challenges (e.g., "when did you last shop at retailer X?"). The questions can be presented on a display device using an interface generated by interface application 130. The questions can be presented by way of an audio signal and speaker, as another example. Transaction platform 110 can organize the received data or aggregate the data with other data. For example, data from a question and answer exchange with a user can be used by transaction platform 110 to authenticate a user or present requested transaction information in an interface element showing a receipt. Transaction platform 110 can organize the received data or aggregate the data with other data using time stamps and clock data for synchronization.

Interface application 130, in some embodiments, is configured to engage a user via a display, interactive display, keyboard, mouse, or other sensory apparatus. Interface application 130 may also be configured to transmit and receive signals or data from such devices and cause data to be sent to transaction platform 110, for example, to append additional information to existing data structures, such as user notes (e.g., bought wife's birthday gift), etc. In some embodiments, interface application 130 is configured to pre-process data before sending the additional transaction data via network 140 to transaction platform 110. The interface application 130 may include a camera interface, a textual interface, an audio interface, among others. The interface is configured to receive inputs for conversion into data sets.

In some embodiments, transaction platform 110 can connect to interface application 130 over a network 140 (or multiple networks). Network 140 (or multiple networks) is capable of carrying data and can involve wired connections, wireless connections, or a combination thereof. Network 140 may involve different network communication technologies, standards and protocols, for example.

In some embodiments, intermediary server 120 can connect to transaction platform 110, for example, via network 140 (or multiple networks). Intermediary server 120 is configured to interconnect with one or more point of sale devices 160, for example, to collect, process, aggregate, store, and/or transmit transaction data for one or more parties to a transaction (e.g., in the form of database records, flat files, API parameters, spreadsheets, flat files, encapsulated data packages). Intermediary server 120 is configured to generate and encapsulate the transaction data or data generated from same to transaction platform 110.

The transaction platform 110 is configured to process the data sets to generate enhancements to the data structure.

In some embodiments, a user engaged at interface application 130 may be asked, via display elements on an interface, to identify themselves as a customer of one or more merchants, for example, by providing their credit card number used in transactions with the merchant.

The data is then parsed and data relevant for or enabling efficient storage or presentation to a user (for example, as a user-friendly e-receipt) is extracted. In this example, a store or a cashier at a point of sale terminal is able to recognize that the customer is a long-time customer with a long purchase history of products, and may be able to offer exclusive products or services tailored based on the customer's known receipt history. Data may be reconstructed or transformed to generate additional insights or aggregated information for a user (e.g., overall spending patterns, types of products bought, additional savings opportunities, adherence to financial goals).

In some embodiments, the processing, reconstruction, association with a user, parsing, and/or extracting can be performed by intermediary server 120. Using intermediary server 120, there may be a reduced need for retrofit or other types of modifications onto a point of sale device 160. In some embodiments, same can be performed by transaction platform 110. Intermediary server is useful where a point of sale device 160 cannot be feasibly retrofitted for interoperation (e.g., point of sale device 160, in some scenarios, may include obsolete technology).

Intermediary server 120 can also connect to one or more point of sale devices 160, for example, to collect, process, aggregate, store, and/or transmit transaction data for one or more parties to a transaction. Intermediary server 120 can send the transaction data or data generated from same to transaction platform 110. The data can be processed, reconstructed, and/or associated with a user to whom it relates. For example, the data may be parsed and data relevant for or enabling efficient storage or presentation to a user (for example, as a user-friendly e-receipt or as a security question) can be extracted.

Intermediary server 120 is configured with access credentials and is able to connect with point of sale devices 160 and a financial institution backend to map and generate/maintain relationships between merchant identity, user identity, and transaction information. Accordingly, sensitive information may be handled at the intermediary server 120 and not at the merchant or the financial institution. In some embodiments, intermediary server 120 is configured to ensure that only processed information is output, and trusted information stored thereon for generating the relationships is not otherwise accessible by either financial institutions, users, or merchants.

Transaction platform 110 can store or transmit the data to a user interface or a downstream data processor (e.g., a data aggregator used for generating population level insights). For example, the data can be transmitted to an interface application 130 for presentation to a user in a display or dynamic interface element. In some embodiments, the display can include a receipt element. Interface application 130 can dynamically engage a user via dynamic interface elements generated by interface application 130 or transaction platform 110. The dynamic engagement may include additional information to be received for appending onto the transaction details (e.g., warranty information, customer notes).

Figure 7:
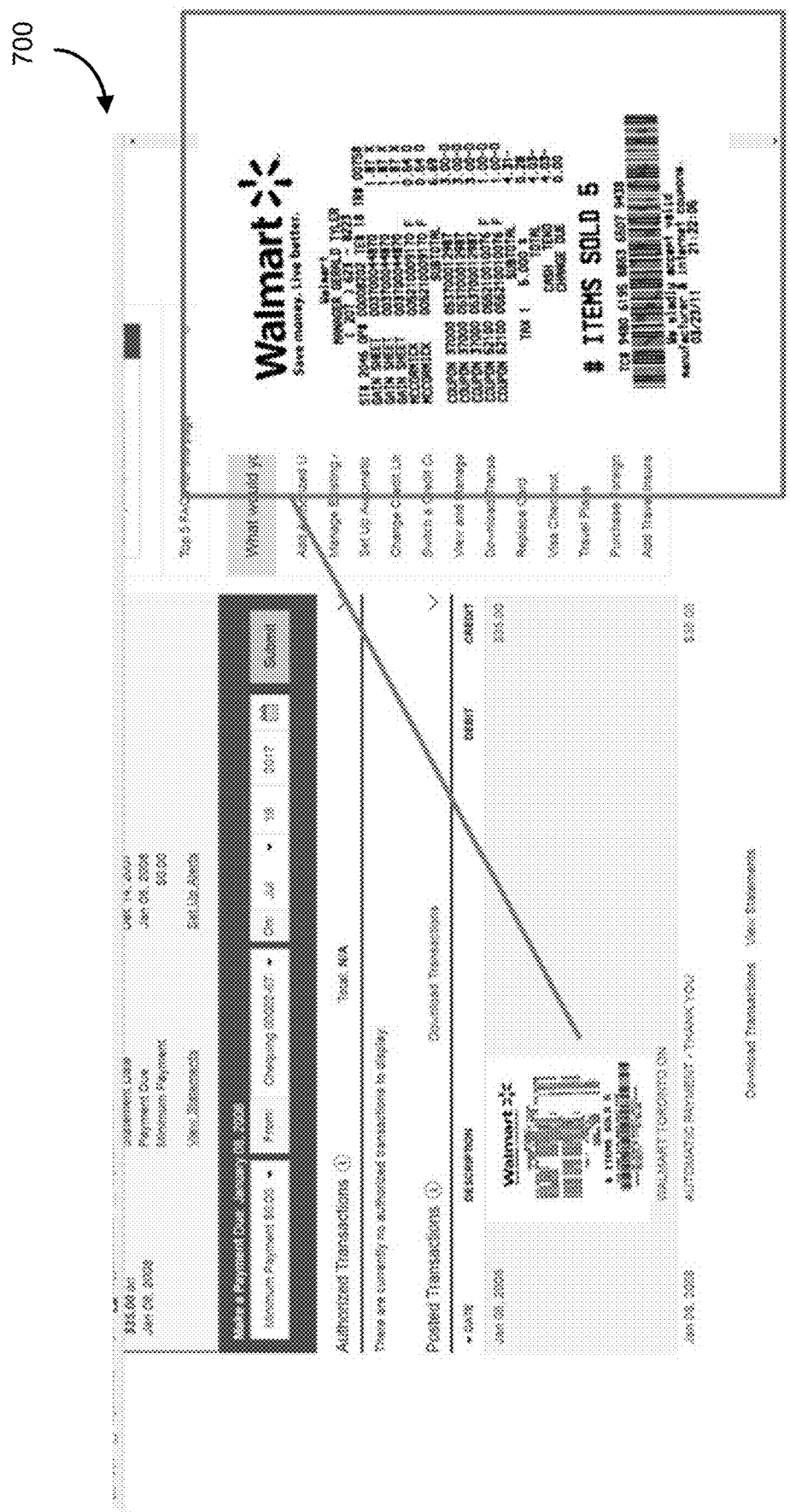
FIG. 7 is an example transaction system interface generated at an interface application, according to some embodiments.

For example, interface application 130 can generate (or request transaction platform 110 to facilitate generation of) a display or interactive interface elements based on input received from a user. The user can request an electronic representation of a particular transaction, for example, by selecting an interface element containing a description of the transaction. Interface application 130 can send a request to transaction platform 110 to generate data encoding a receipt for that transaction and transmit same to interface application 130. Interface application 130 can present the receipt as an interface element. In some embodiments, the user can further engage with the receipt or request a refund or exchange from the merchant with whom the receipt evidences a transaction. For example, a receipt is depicted at FIG. 7, rendered on a display interface.

In some embodiments, interface application 130 can generate (or request transaction platform 110 to facilitate generation of) a display or interface element depicting a security question or a series of security questions. For example, the display or interface element can include a text or audio question requesting the user to provide an answer. Interface application 130 is configured to transmit the answer to transaction platform 110. The question, for example, may be based on itemized transaction data of the transaction. For example, the question may be "where have you most recently purchased a pair of gloves?", and most likely, only the user would know where he or she has most recently purchased a pair of gloves.

In some embodiments, platform 110 may be configured to generate a security questions based on a transaction that has occurred within a certain time frame. For example, the platform may be configured to check a timestamp of the transaction, and only generate a security question if the timestamp of the transaction indicates that the transaction has occurred within the last 5 minutes, 5 hours, 5 days, or 5 weeks. That is, there may be a specified maximum time duration between the timestamp of the transaction and a current timestamp of the platform, before the platform is configured to generate the security question based on the transaction. This temporal requirement may help ensure that the security question is generated based on a relatively fresh set of transaction data, so as to avoid fraudulent access of the user account based on legacy transaction data.

Transaction platform 110 is configured to verify the answer using transaction data relating to the user and generate an interface element based on the result of the verification. This can provide a dynamic security process for a user. Subsequent security questions can be generated based on prior security questions presented or one or more answers to one or more prior security questions.

In some embodiments, once a user has been logged into the system after authentication of the user identity based on the security question, platform 110 may be configured to allow access to a suite of services or products, such as account services offered by a financial institution associated with platform 110.

Point of sale device 160 are configured to connect to transaction platform 110 directly or over a network 140 (or multiple networks). Point of sale device 160 transmit data to interface application 130, for example, via messages transmitted to transaction platform 110. One or more point of sale devices 160 interconnect to intermediary server 120, which can in turn connect to transaction platform 110. For example, a multiplicity of transactions may occur at a point of sale device 160.

Point of sale device 160 is configured to send data relating to the transaction (or data generated from processing of same) to an intermediary server 120. The intermediary server 120 is configured to receive data from a multiplicity of point of sale devices 160. Intermediary server 120 processes, reconstructs, and/or associates the data with a user to whom it relates. In some embodiments, a user engaged at interface application 130 may be asked to identify themselves as a customer of one or more merchants, for example, by providing their credit card number used in transactions with the merchant.

For example, the data is parsed and data relevant for or enabling efficient storage or presentation to a user (for example, as a user-friendly e-receipt) is extracted. Intermediary server 120 transmits the data to transaction platform 120, for example, for storage or association with other transaction data relating to the same merchant, user, party to the transaction, date, or other characteristic of the transaction (e.g., demographic of a party to the transaction, subject of the transaction, etc.).

In some embodiments, point of sale device 160 is configured to send data relating to the transaction (or data generated from processing of same) directly to a transaction platform 110. The transaction platform 110 can receive data from a multiplicity of point of sale devices 160. Transaction platform 110 can process, reconstruct, and/or associate the data with a user to whom it relates.

In some embodiments, a user engaged at interface application 130 may be asked to identify themselves as a customer of one or more merchants, for example, by providing their credit card number used in transactions with the merchant. For example, the data may be parsed and data relevant for or enabling efficient storage or presentation to a user (for example, as a user-friendly e-receipt) can be extracted.

Transaction platform 110 can transmit this data to transaction platform 120, for example, for storage or association with other transaction data relating to the same merchant, user, party to the transaction, date, or other characteristic of the transaction (e.g., demographic of a party to the transaction, subject of the transaction, etc.).

Point of sale device 160 can send transaction data to intermediary server 120 and/or to transaction platform 110 in the same message the transaction is requested (for example, to a credit card company), concurrently that the transaction is attempted (for example, when a request is made to a credit card company), or after the transaction has completed. Accordingly, the information does not need to be sent twice, reducing an overall time required to process the transaction. In some embodiments, one or more harvester applications (e.g., daemons) may be operated by intermediary server 120 to periodically or continuously extract information from one or more point of sale devices 160.

In some embodiments, external systems 150 is configured to connect to transaction platform 110, for example, via network 140 (or multiple networks). External systems 150 includes one or more databases or data sources or one or more entities that aggregate or process data. External systems 150 may, in some embodiments, be configured to provide additional information, such as relationships with SKU numbers (e.g., where external systems 150 includes inventory management systems), etc. The additional information may be combined in updating and/or enhancing the data structure to reflect additional transaction information.

External systems 150 are configured to receive data from an interface application 130, transaction platform 110, intermediary server 120, and/or point of sale device 160. This data can include raw or processed transaction data originally collected by point of sale device 160, such as a copy of a message sent to a credit card company during or after a transaction. External systems 150 are configured to transmit data to a transaction platform 110, intermediary server 120, interface application 130, and/or point of sale device 160.

This connectivity can facilitate the viewing, manipulation, and/or analysis of the data by a user engaged with external systems 150.

For example, a merchant can access receipts generated by transaction platform 110 or intermediary server 120 that correspond to the merchant (based on, for example, a merchant identifier). The merchant can validate the receipt and in some embodiments, the validation can be presented to a user (e.g., the customer who transacted with the merchant in the transaction described by the receipt) with the receipt at an interface application 130.

An example application may be for validation of rewards points redemption, collection, among others.

Figure 2:
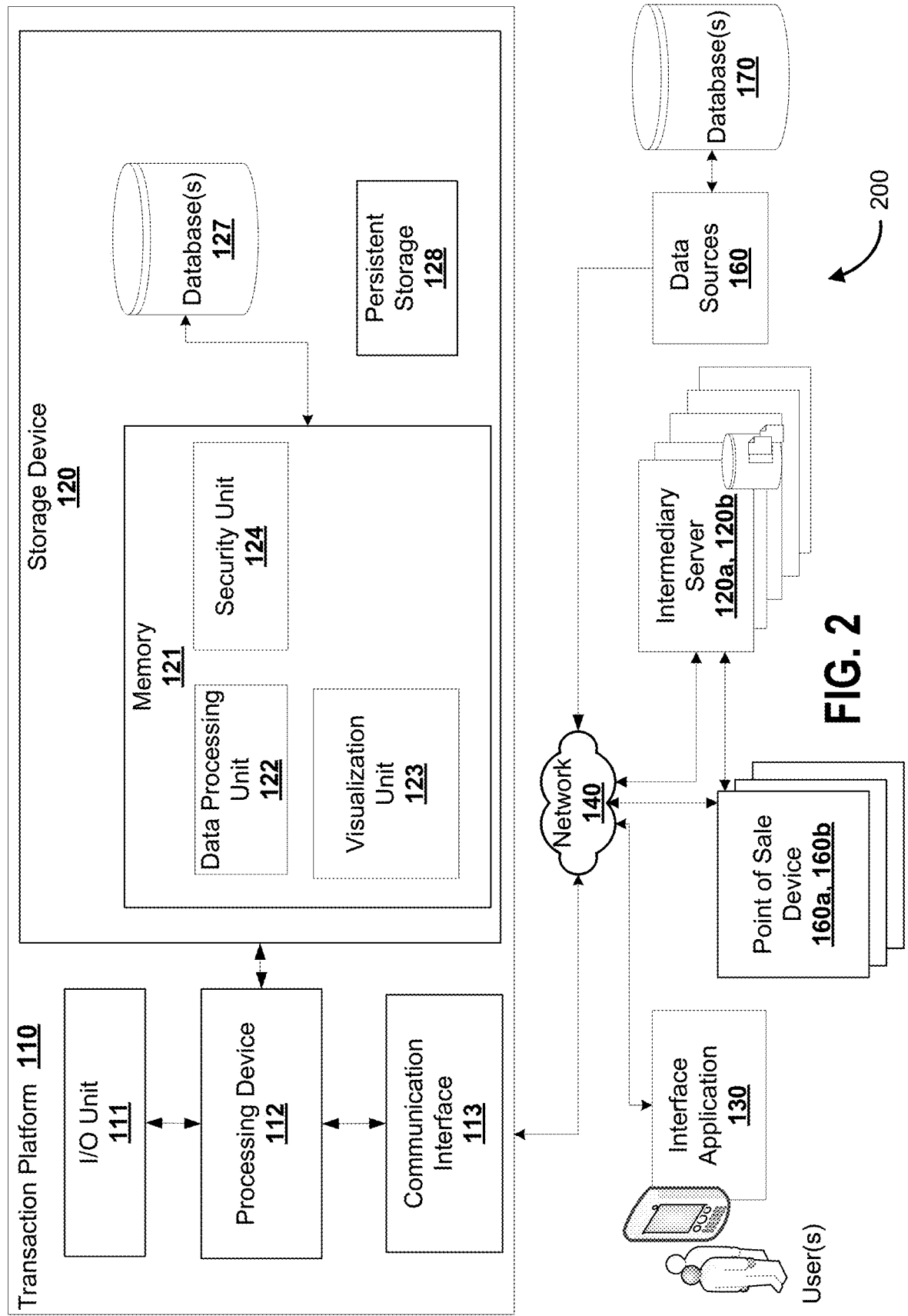
FIG. 2 is a view of an example transaction platform according to some embodiments.

FIG. 2 is a block schematic of an example transaction platform 110 according to some embodiments. A transaction platform 110 can include an I/O Unit 111, processing device 112, communication interface 113, and storage device 120.

A transaction platform 110 is configured for interconnection with one or more interface applications 130, point of sale devices 160, intermediary servers 120, data sources 160, and/or databases 170. This connection may be over a network 140 (or multiple networks). An example network is the Internet. Intranets and other point to point or multipoint network topologies are possible. Transaction platform 110 receives and transmits data from one or more of these via I/O unit 111. When data is received, I/O unit 111 transmits the data to processing device 112.

Each I/O unit 111 is configured to facilitate interconnections with one or more input devices, such as a keyboard, mouse, camera, touch screen and a microphone, and/or with one or more output devices such as a display screen and a speaker.

A processing device 112 can execute instructions in memory 121 to configure classification device 120, and more particularly, data processing unit 122, visualization unit 123, and security unit 124. A processing device 112 can be, for example, any type of general-purpose microprocessor or microcontroller, a digital signal processing (DSP) processor, an integrated circuit, a field programmable gate array (FPGA), a reconfigurable processor, or any combination thereof.

In some embodiments, a specialized processor is utilized, and the device and/or platform 110 is configured as a special purpose device that is designed for insertion into a data center. For example, in embodiments where platform 110 is a special purpose device, processors are optimized for data record maintenance and designed for reduced processing times. In such an example, the platform 110 can be a rack-mounted server appliance that is configured for placement in a server rack and interconnection to an internal message bus to obtain transaction information.

The physical, rack mounted server appliance is particularly well suited for applications whereby a large volume of transactions are being conducted in relation to accounts held by a single source, and maintenance operations of the data structure are optimized in the data center (e.g., the data center of a financial institution). The data center may have APIs for coupling with point of sale devices 160 to receive data sets for enhancing a data structure.

Memory 121 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 120 can include memory 121, databases 127, and persistent storage 128.

Each communication interface 123 is provided to establish communications for the transaction platform 110 to communicate data with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WiMAX), SS7 signaling network, fixed line, local area network, wide area network, and others, including any combination of these.

The transaction platform 110 is configured to register and authenticate users (using a login, unique identifier, and password for example) prior to providing access to applications, a local network, network resources, other networks and network security devices. The platform 110 may serve one user or multiple users.

The storage 127 is configured to store information associated with or created by the storage device 120. Storage 127 and/or persistent storage 128 may be provided using various types of storage technologies, such as solid state drives, hard disk drives, flash memory, and may be stored in various formats, such as relational databases, non-relational databases, flat files, spreadsheets, extended markup files, etc.

Data processing unit 122 is configured to receive data collected or generated at a point of sale device 160 or at an intermediary server 120. Data processing unit 122 can process the data, for example, to select and extract data suitable for storage, association with a particular user, or generation of a display, interface element, or interactive interface element. For example, data processing unit 122 can receive data identifying a merchant, a transaction party, a transaction amount, transaction date and time, and a transaction subject or service. Data processing unit 122 can associate the data with a user corresponding to a transaction party, for example, using a map data structure, user and party identifiers, and authentication technologies such as encryption.

Data processing unit 122 is configured to generate data enabling the presentation of an interface element corresponding to a transaction, for example, a receipt depicting the transaction data, logo corresponding to the merchant identified in the transaction data, and interactive display elements. For example, the interface element can contain a receipt in a merchant specific format, using a stored or received merchant identifier and dynamic input from a merchant that can indicate specific logo, branding, and format. Logos can be selected, for example, by cross-referencing a look up table, a relational database, etc. In some embodiments, logos may further be obtained in relation to products (e.g., a particular brand of sneakers, hats).

Data processing unit 122 is configured to generate data enabling the presentation of an interface element corresponding to a transaction, for example, one or more security questions reflecting one or more transactions of which the user presented with the security question was a party to.

Data processing unit 122 is configured to generate data in a form that facilitates the storage and/or retrieval of transaction data.

Data processing unit 122 can store or transmit the data or generated data to a component of storage device 120, one or more databases 127, persistent storage 128, intermediary servers 120, interface applications 130, databases 170, or external entities 150. For example, data processing unit 122 can send the data to visualization unit 123 or to security unit 124.

Visualization unit 123 is configured to receive data from data processing unit 122, such as transaction data or data generated from transaction data. Visualization unit 123 can generate data enabling the presentation of an interface element corresponding to a transaction, for example, a receipt depicting the transaction data, a logo corresponding to the merchant identified in the transaction data, and interactive display elements. Visualization unit 123 can reconstruct transaction data to a form suitable for presentation. Visualization unit can identify transaction data or generated data that corresponds to a given user.

Visualization unit 123 can transmit the data to an interface application 130 for presentation to a user, for example, the user to which the transaction data relates. For example, the user can request, via interface application 130, an electronic receipt for an indicated transaction. Interface application 130 can request the generation of the electronic receipt from transaction platform 110 or intermediary server 120. Visualization unit 123 or intermediary server 120 can identify the relevant transaction, extract or retrieve the relevant data (for example, generated data that enables the presentation of an interface element), and transmit the data to interface application 130. Visualization unit 123 or interface application 130 can generate an interface element presenting the data as an electronic receipt. Interface application 130 can present the interface element to the user. The user can view or print the receipt, for example.

Security unit 124 can receive data from data processing unit 122, such as transaction data or data generated from transaction data. Security unit 124 can generate data enabling the presentation of an interface element corresponding to a transaction, for example, one or more security questions reflecting one or more transactions for a given user. Security unit 124 can transmit the data to an interface application 130 for presentation to a user, for example, the user to which the transaction data relates. For example, the user can request, via interface application 130, access to the user's bank account. Interface application 130 can request access to the account data from transaction platform 110 or intermediary server 120.

Security unit 124 or intermediary server 120 can identify transaction data relating to the user, for example, from a set of aggregated data. Security unit 124 or intermediary server 120 can generate data, for example, a request or a question, that prompts the user to provide information verifiable by transaction data (e.g., transaction history) relating to the user. Security unit 124 or intermediary server 120 can transmit the data, for example, a request or a question, to interface application 130. Security unit 124 or interface application 130 can generate an interface element presenting the data as a security question. Security unit 124 or intermediary server 120 can compare or verify a response received from a user at interface application 130 to transaction data relating to the user. This can involve identifying transaction data that corresponds to the user. Interface application 130 can present the interface element to the user.

Figure 3:
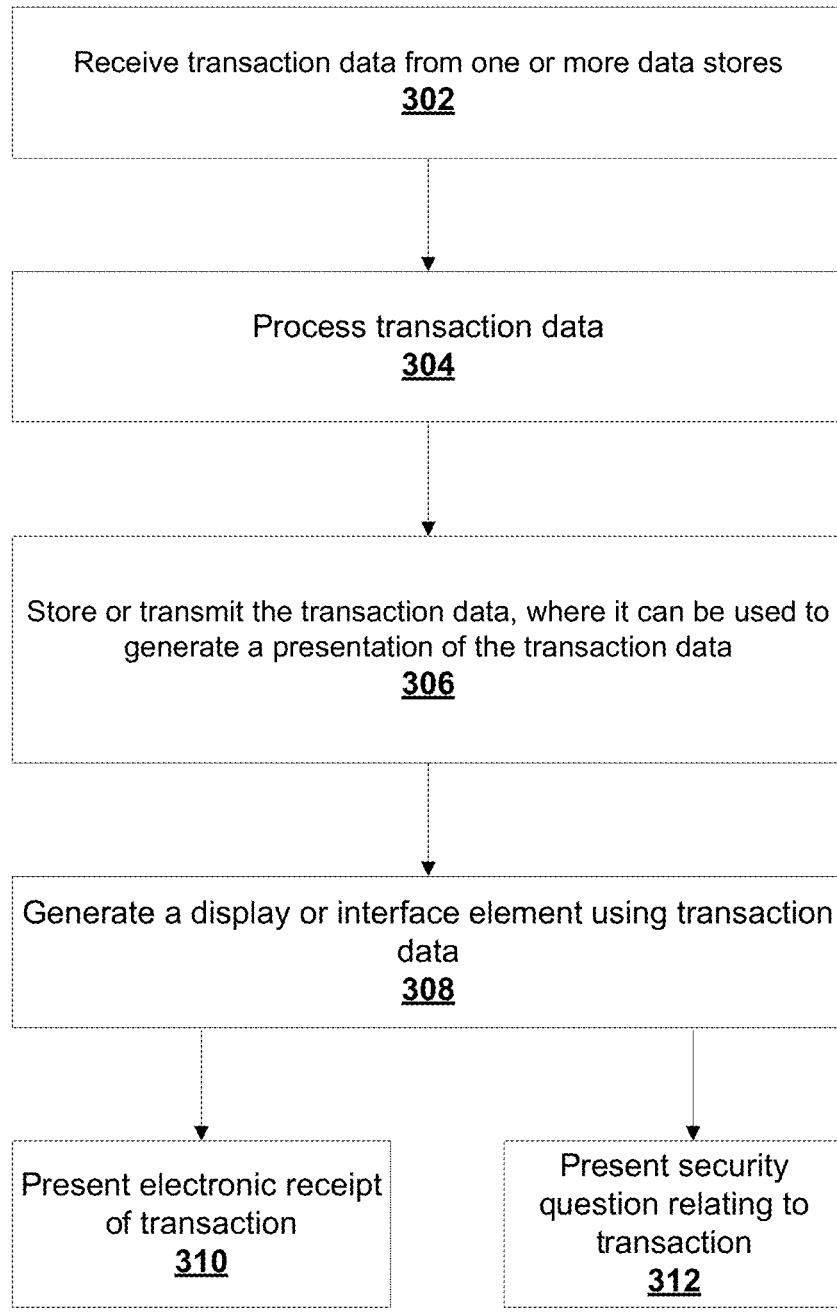
FIG. 3 is an example flow diagram according to some embodiments of transaction system.

FIG. 3 is an example flow diagram according to some embodiments of transaction system 100.

At 302, transaction system 100 receives transaction data from one or more data stores. The data can be received at an intermediary server 120 or at a transaction platform 110.

At 304, transaction system 100 processes the transaction data. For example, transaction system 100 can associate the data with a user corresponding to a transaction party, for example, using a map data structure, user and party identifiers, and authentication technologies such as encryption.

In some embodiments, a user engaged at interface application 130 may be asked to identify themselves as a customer of one or more merchants, for example, by providing their credit card number used in transactions with the merchant. Transaction system 100 can generate data enabling the presentation of an interface element corresponding to a transaction, for example, a receipt depicting the transaction data or a security question that can be used to authenticate a user based on transaction data. Transaction system 100 can generate data facilitating or enabling the storage or transmission of the data, for example, for later presentation of an interface element corresponding to a particular transaction or particular user.

At 306, transaction system 100 stores or transmits the transaction data. The transaction data or data generated from same can be used to generate a presentation of the transaction data.

At 308, transaction system 100 generates a display or interface element using transaction data. For example, interface application 130, transaction platform 110, or intermediary server 120 can generate an interface element, interactive interface elements (e.g., scroll bars, drag and drop elements, dynamic widgets responsive to user input or new transaction data, etc.), display, or user experience based on the transaction data.

At 310, the display or interface element is presented to a user engaged with transaction system 100 at an interface application 130. For example, the display or interface element can comprise an electronic receipt of a transaction corresponding to the transaction indicated by the user.

Alternatively or in addition to 310, at 312, the display or interface element is presented to a user engaged with transaction system 100 at an interface application 130. For example, the display or interface element can comprise one or more security questions based on a transaction or transaction history for the user.

Subsequent security questions can be dynamically determined based on the user's responses to previous security questions, the user's interaction with interface application 130, or new or updated transaction data received, stored, or generated at transaction platform 110.

For example, transaction platform 110 can identify trends in user transactions across a demographic of users including the user. Transaction platform 110 can generate data encoding indication of same and use the data to generate a new security question for the user. This function may be performed by intermediary server 110 in some embodiments where intermediary server 110 is present in transaction system 100.

Figure 4:
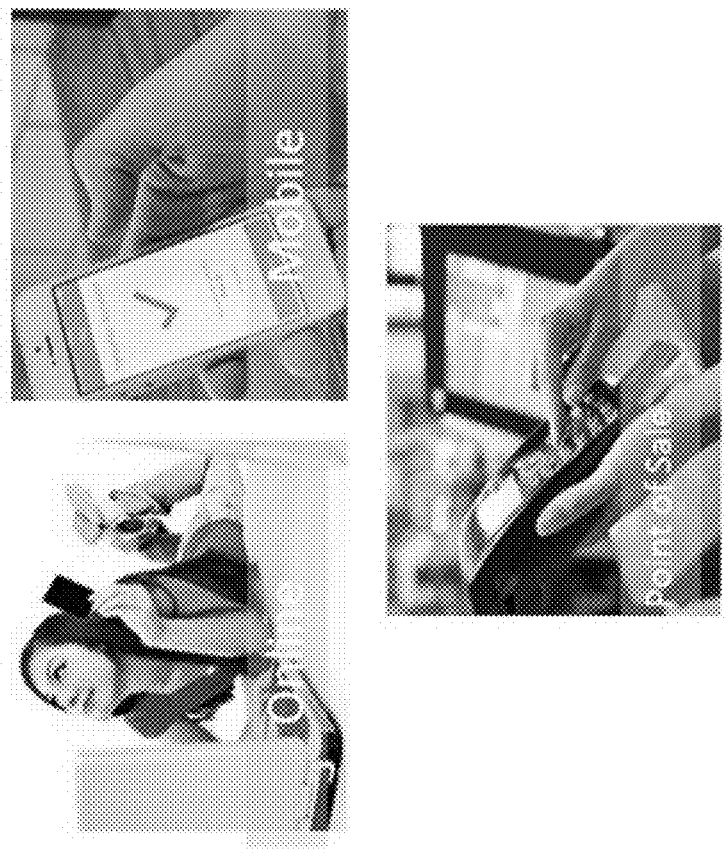
FIG. 4, FIG. 5, and FIG. 6 are example screen capture images depicting contexts in which some embodiments of transaction system can be used.

FIG. 4 is a screenshot 400 depicting an example context in which transaction system 100 can be used. Customers use different channels or marketplaces to purchase items from different merchants. Customers may desire to find their old receipts or bills.

Figure 5:
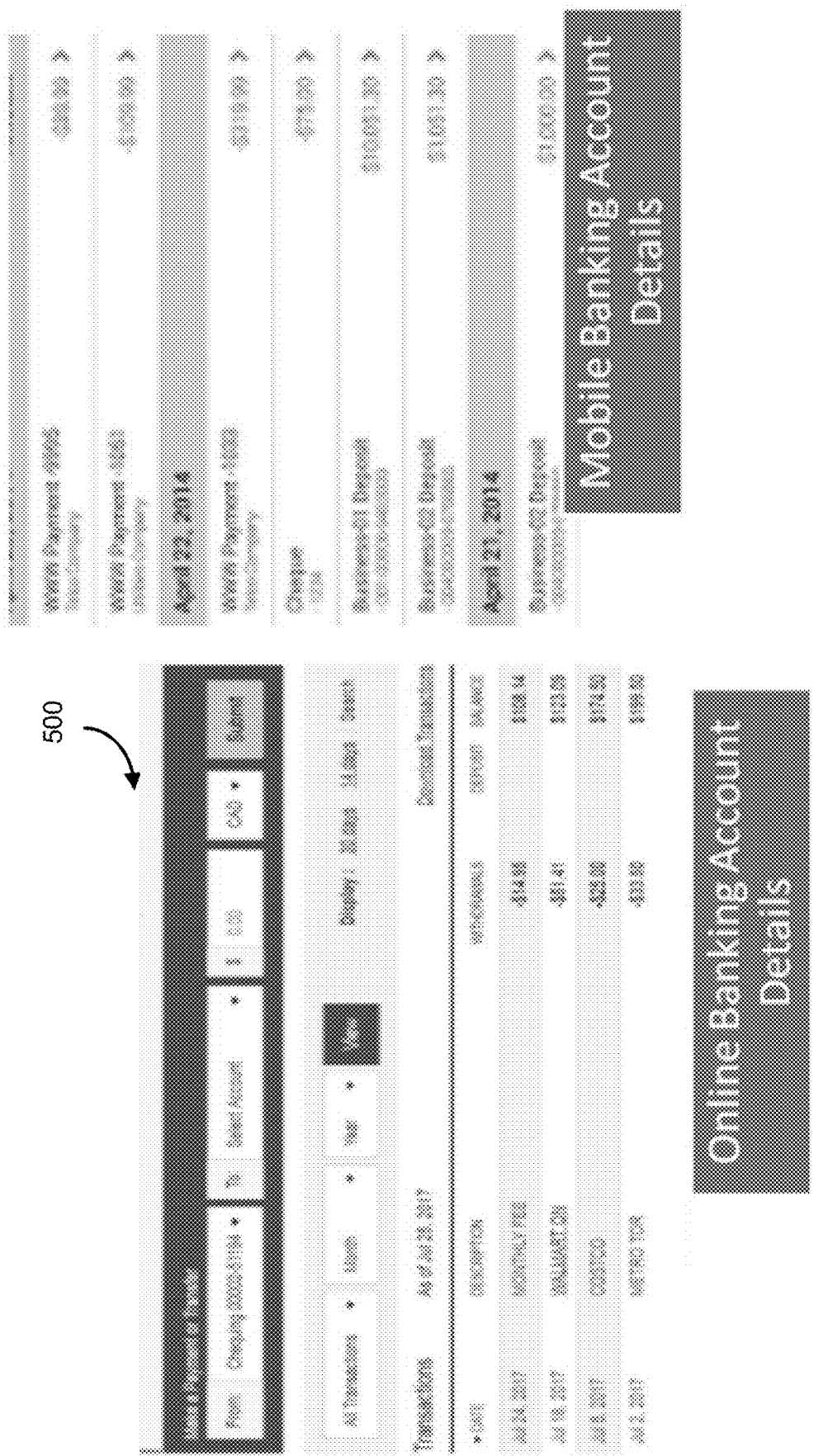

FIG. 5 is a screenshot 500 depicting an example context in which transaction system 100 can be used. Customers may desire to have detailed bills for items that are viewable on online or mobile banking platforms.

Figure 6:
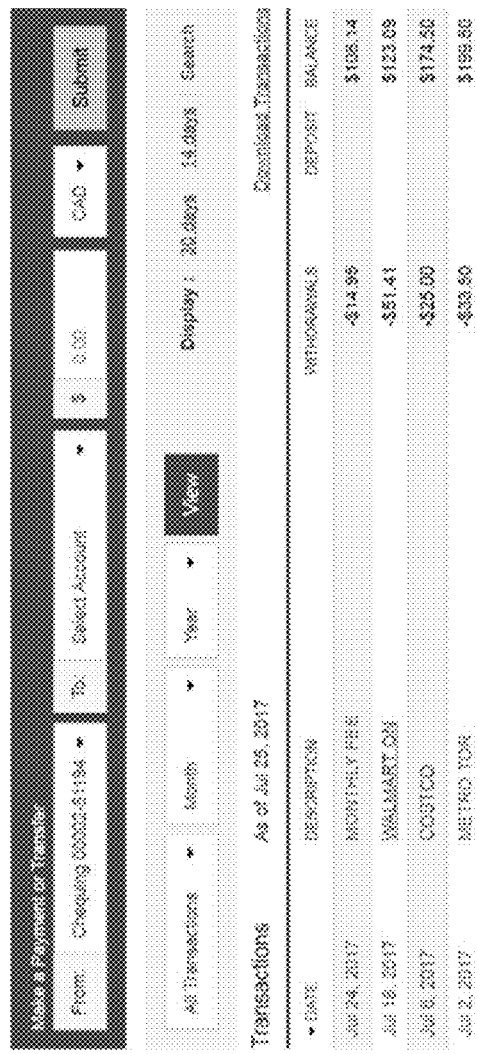

FIG. 6 is a screenshot 600 depicting an example context in which transaction system 100 can be used. The hard copy is not always handy, even when a user has time to go through the items purchased. Often people misplace the receipt and cannot figure out how the bill added up when we get time to check all or people cannot return the product or price match since the merchant will not accept the product without the receipt.

FIG. 7 is a screenshot 700 depicting an example transaction system 100 interface, for example, presented at interface application 130, according to some embodiments. Transaction system 100 can allow users to view/print the detailed receipts of the items purchased and do so from their Online/Mobile Banking Transaction Details page along with the transaction. Transaction system 100 is configured to allow users to view receipts online such that users do not have to contend with paper receipts or misplacing receipts.

Transaction system 100 can allow users to check how much a merchant (e.g., Walmart™) has charged users for a transaction and request the merchant to refund them any amount exceeding what is proper. In order for a user to be able to refund one or more items based on an electronic receipt generated by transaction system 100, a transaction ID on the electronic receipt may be used to verify that the electronic receipt is authentic. Moreover, the transaction ID may be used to link the electronic receipt to the transaction data stored at the merchant's system, which may be used to verify that an item being returned was in fact purchased in a transaction associated with the transaction ID.

In some embodiments, instead of, or in addition to the transaction ID, the electronic receipt may further contain a representation of the transaction ID to verify the transaction. For example, the electronic receipt may include a hash code, a bar code, or a QR code generated based on the transaction ID. Upon reading and processing the hash code, the bar code or the QR code, merchant computing system may be able to get the transaction ID, and use it to verify details of the transaction in order to facilitate the refund for the user.

In some embodiments, transaction system 100 can allow third parties, for example, a bank hosting transaction platform 110 or a party engaged with an external system 150 to perform analytics on transaction data.

For example, the bank can determine using transaction system 100 that Dileep visits Costco™ more frequently than Walmart and that the bank should target him offers from Costco™ and not Walmart™. As another example, the bank can determine using transaction system 100 that Arun had to spend a lot for purchasing a necklace for his wife and that the bank should offer him some Line of Credit. Since the bank has the knowledge of the items purchased in a transaction, the bank can apply data analytics techniques to obtain details on customer's purchase preferences and patterns. The bank is able to offer more personalized schemes to their customers based on the insights gained from the receipt of a transaction.

For another example, the bank can apply data analytics to generate trend reports representing consumer's spending habit. For instance, the report may indicate a consumer (e.g. a user) has spent X amount of dollars on coffee, diapers and/or tissue paper in a week or a month, or during a specified time period. The report is made possible since each item being purchased in one or more transactions is recorded based on the transaction data of each transaction being analyzed by system 100.

Figure 8:
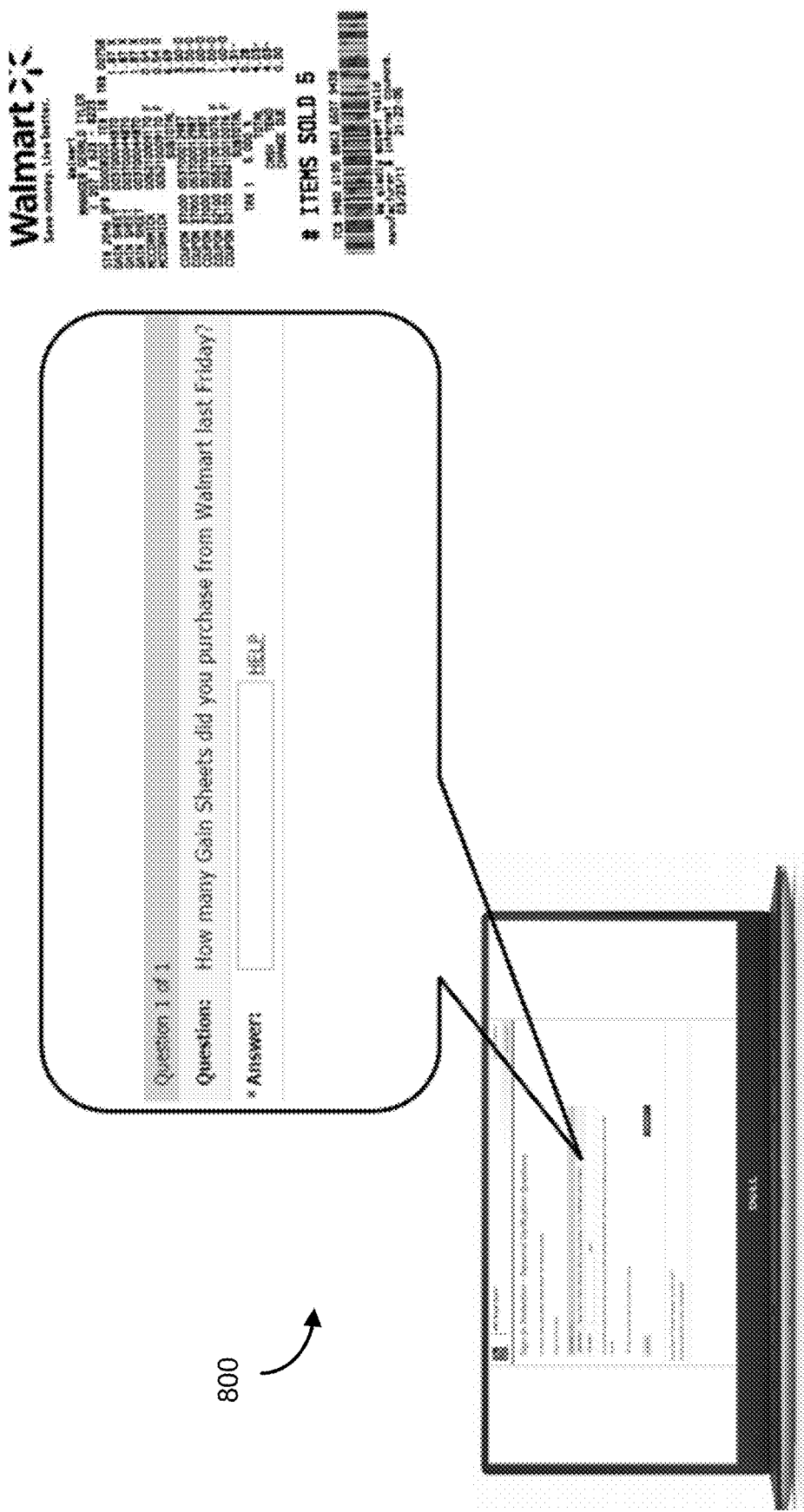
FIG. 8 is an example interface element generated at an interface application.

FIG. 8 depicts an example interface element 800 presented at interface application 130. Transaction system 100 is configured to increase the security of a system by presenting dynamic security questions which only the user will know.

Figure 9:
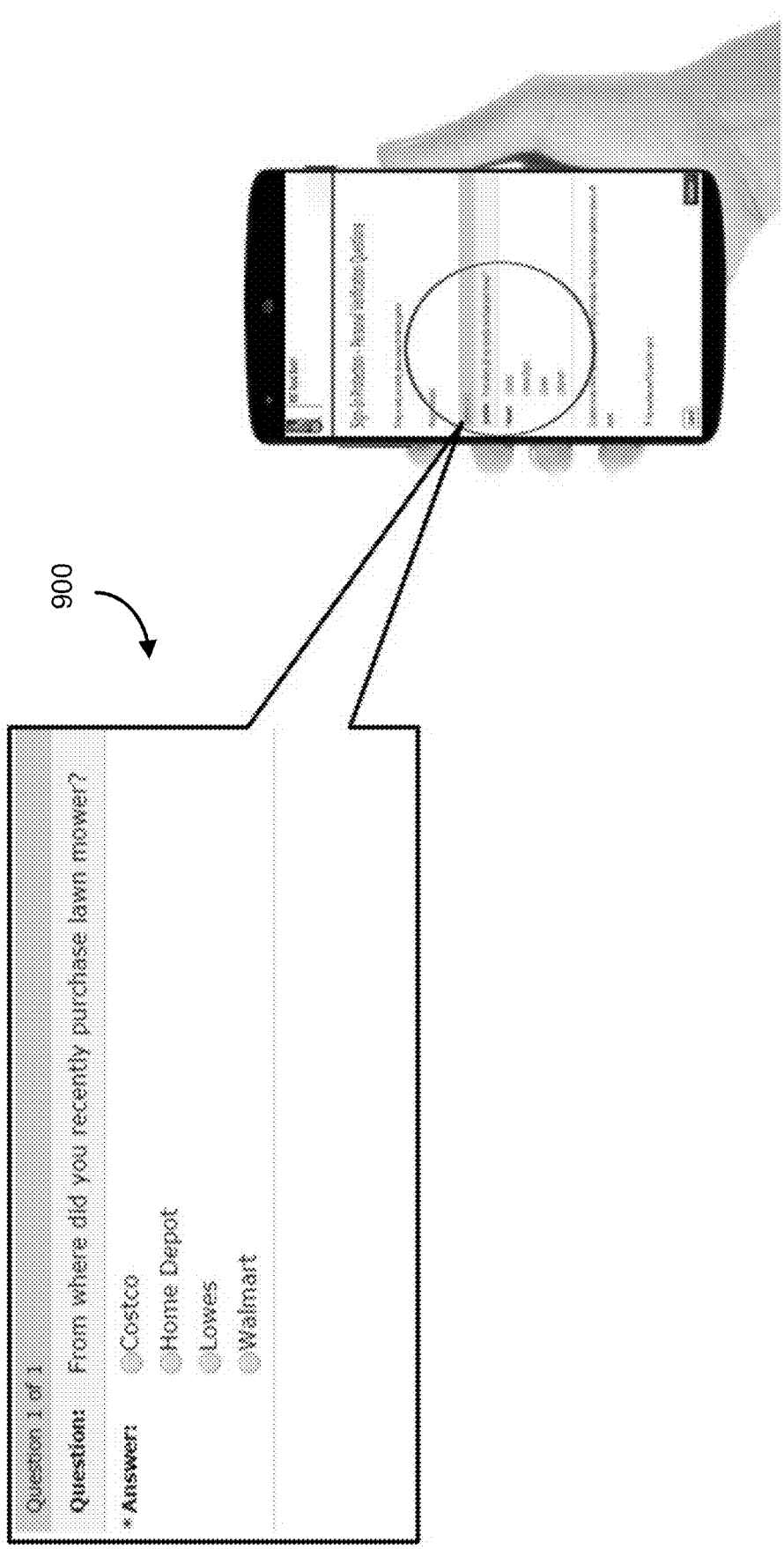
FIG. 9 is an example interface element generated at an interface application and accessible via a mobile device.

FIG. 9 depicts an example interface element 900 presented at interface application 130 accessible via a mobile device. A user can be asked to authenticate their identity by answering a multiple choice security question where the question and choices are based on their transaction data. The security measures may offer an advantage to bank workflows and consequently to user convenience. Users may benefit from having access to these features as they can solve a bunch of their hassles for "book-keeping" paper receipts. For example, a user may decide to use a bank more often for reason that if make all their purchases using that bank's credit/debit cards, the user will not have worry about receipts.

Figure 10:
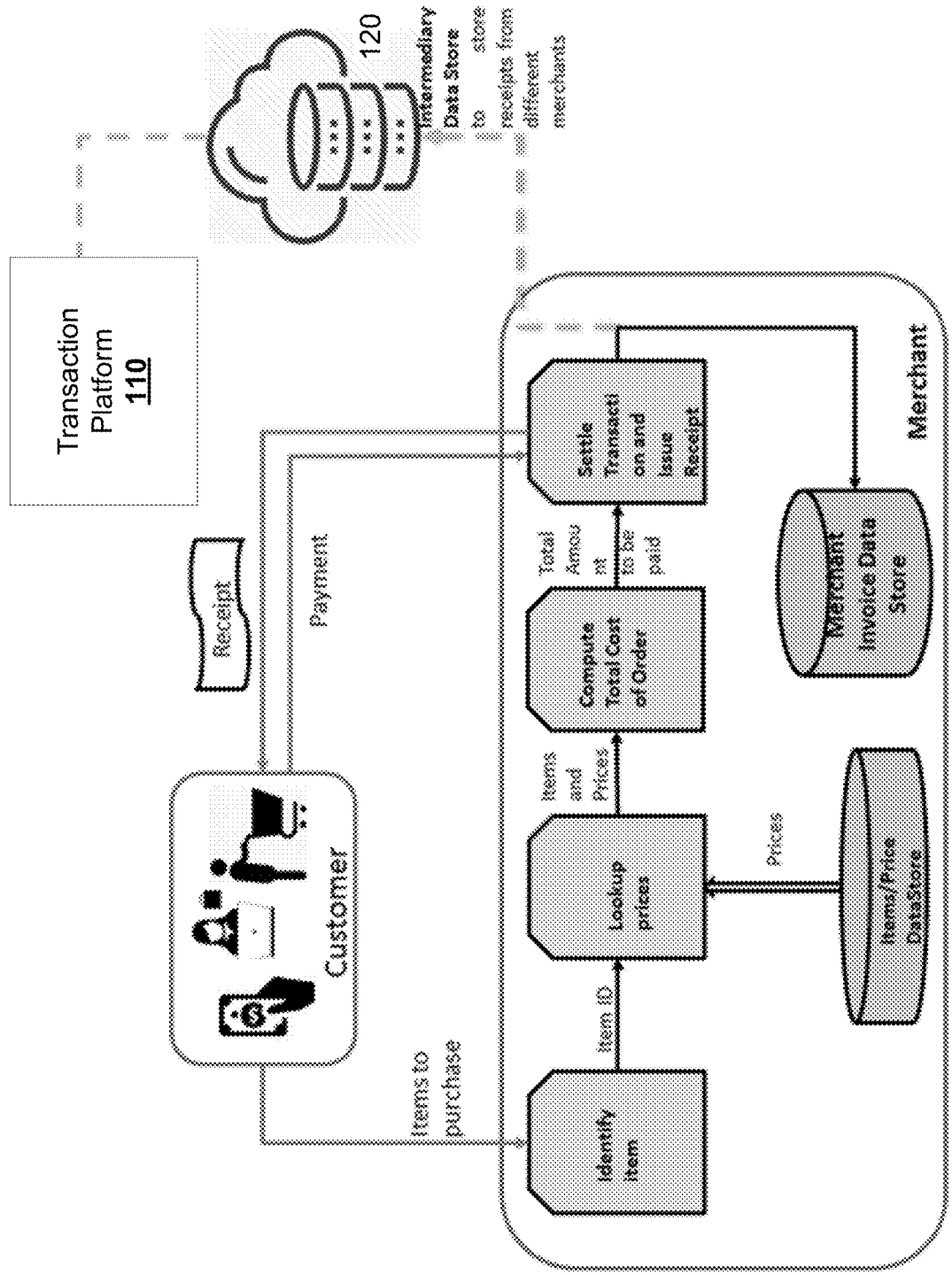
FIG. 10 is an example data flow of a transaction system according to some embodiments.

FIG. 10 depicts an example data flow of transaction system 100 according to some embodiments. At point of transaction, a merchant can issue a receipt to the customer as well as send transaction data, for example, receipt information, to an intermediary data store 120, which can receive transaction data from a multiplicity of merchants. A bank at transaction platform 110 can receive transaction data (or data generated from the transaction data) from intermediary data store.

Figure 11:
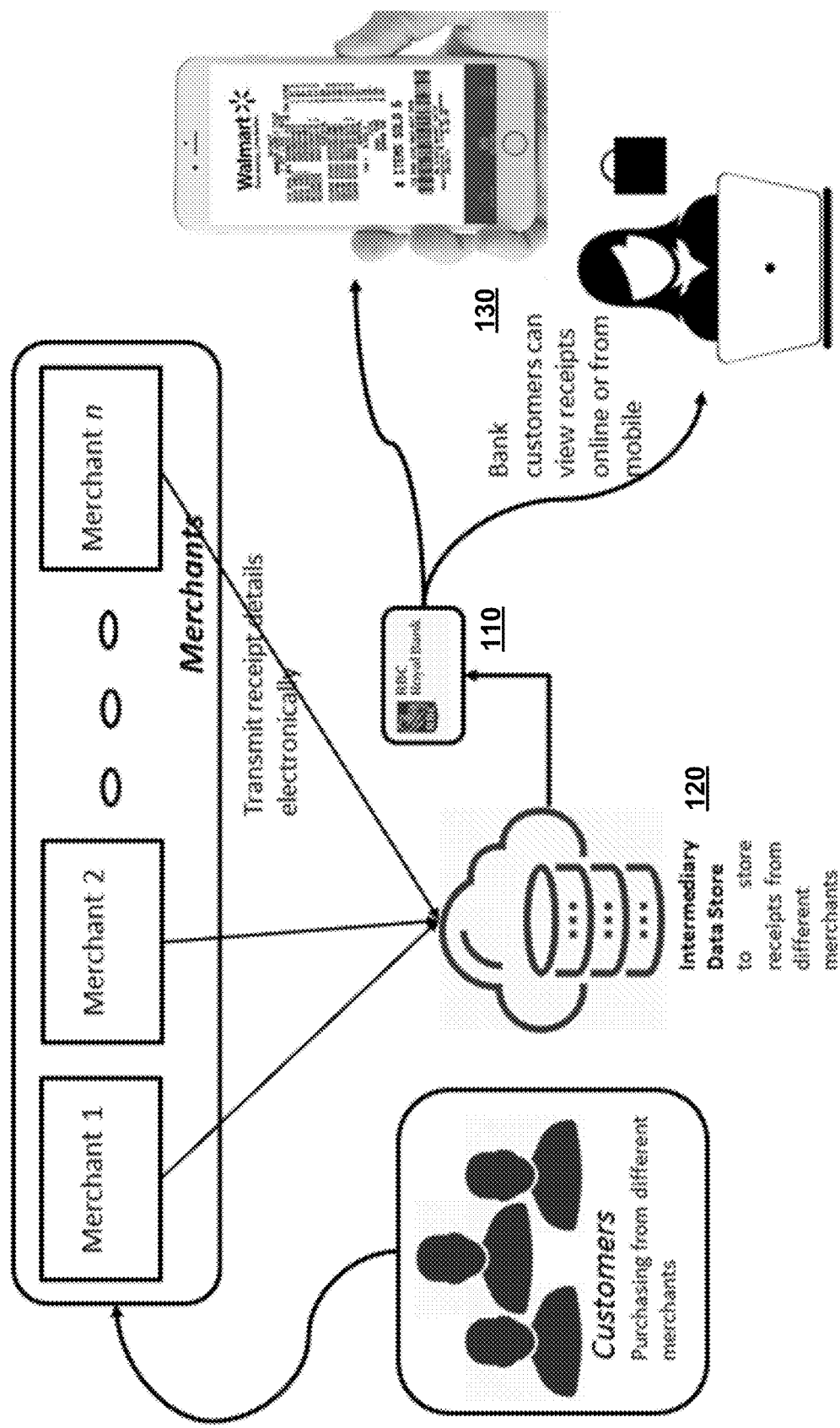
FIG. 11 is an example block diagram of a transaction system according to some embodiments.

FIG. 11 depicts an example diagram of transaction system 100 according to some embodiments. Multiple customers can each transact with each of one or more merchants. Each merchant can transmit transaction data, for example, that can be used to generate an electronic receipt, to a single, centralized intermediary data store 120.

A bank hosting transaction platform 110 or a bank engaged at an external system 150 can receive transaction data corresponding to any of, each of, or all of the transactions from each of the customers. Bank customers can engage with electronic receipts evidencing one or more of their transactions (e.g. with all of their merchants) in an interface element generated at or presented at interface application 130. Interface application 130 can be accessible online or via mobile, for example.

FIG. 12 depicts an example data structure for transaction data or receipt details transmitted by a merchant to, for example, a transaction platform 110 or intermediary server 120. Transaction data can relate to merchant, customer, purchase, item description, item quantity, invoice, cost, and tax, for example.

FIG. 13 depicts example security questions derived from details from a merchant that can be used for authentication. The receipt details can be used by bank to validate the user during login. Since the user only will be privy to these details, bank can add an extra layer of security and prevent attacks even if user's password gets compromised. For example, the questions can elicit transaction information pertaining to shop identity, when, which item, how many items, brand, and location.

Figure 14:
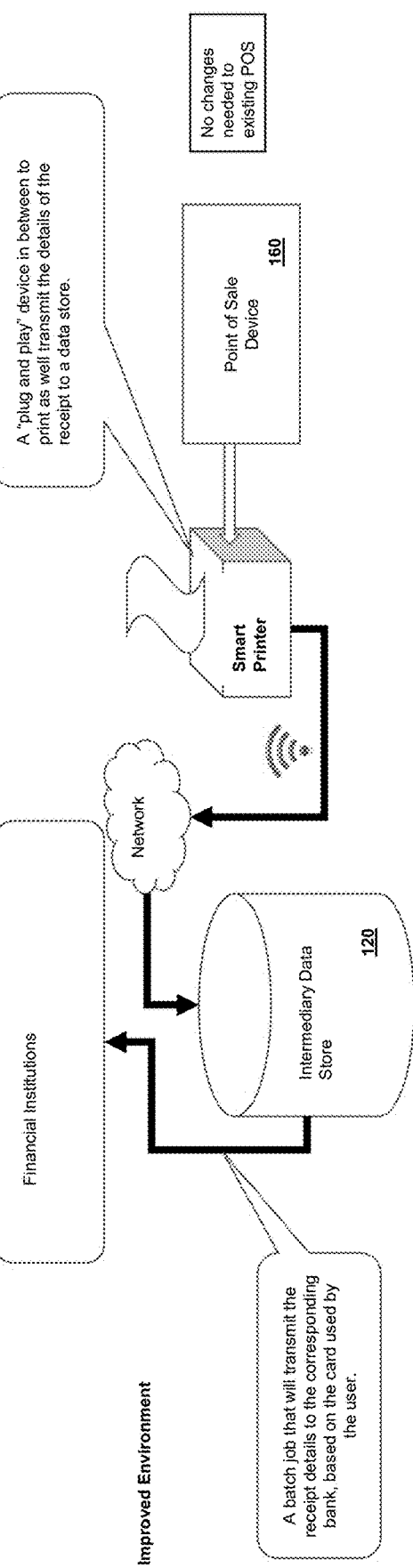
FIG. 14 is a block schematic diagram illustrating a comparison between an example environment and an improved environment, according to some embodiments.

FIG. 14 is a block schematic diagram illustrating a comparison between an example environment and an improved environment, according to some embodiments. In FIG. 14, two environments are shown.

In the example environment, the point of sale device 160 connects to a printer, but the printer does not connect to the intermediary server 120. Accordingly, a retrofit may be required to point of sale device 160 to provide an ability to generate electronic receipt data in accordance with some embodiments. The retrofit may be costly and challenging given that many point of sale devices 160 utilize differing standards, protocols, communication pathways, and/or have differing physical dimensions and constraints.

An improved environment is shown in the bottom half of FIG. 14, whereby an improved smart printer is configured for communication and interoperation with intermediary data store 120 across a network, whereby information may be transferred to the financial institutions through the printer, for example, during the generation of a physical receipt, etc.

In accordance with this example, there are minimal or no changes required to an existing point of sale device 106, and the smart printer may be configured to receive print receipt information and automatically generate and communicate one or more data sets indicative of information that relate to the electronic receipt, and in some embodiments, the printer further transmits data sets indicative of formatting and other options (e.g., logo placement, QR code/bar-code generation).

Additional data sets or data structures may be incorporated that aid in establishing veracity of either the printed receipt, the electronic representation of the receipt, and in some embodiments, the additional data sets may be designed complementarily such that one verifies the other (e.g., complementary encryption, multi-key hashes, the use of multiple symmetric/asymmetric keys, cross-stored hashes). Where additional data sets are incorporated that are complementary to one another, a potential improvement may be that physical receipts are more difficult to falsify. Watermarking, steganography, or other features may be further included.

The improved embodiment allows for an easier implementation relative to the example environment, as the merchant can replace the existing printer with the new smart printer without retrofitting the point of sale device. The smart printer extracts relevant data from the receipt (e.g., transforms the data from binary format to JSON) and transmit the information through, for example, encapsulated data sets to the intermediary data store via an application programming interface (e.g., REST web service that operates across a network).

In some embodiments, a special purpose device is provided that is configured for plug and play usage, and accordingly, there may not be required any system change needed at merchant side. Onboarding is facilitated, and such features are particularly useful for small business/small shops who has fewer point of sale devices 160.

Embodiments of methods, systems, and apparatus are described through reference to the drawings.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Specific technical improvements are described herein that describe configured computers and data architectures that are programmed to interoperate between merchant terminals and user devices to provision and generate electronic receipts or other indicia of transaction information. In some embodiments, the configured computers are adapted to maintain, or otherwise store, in adapted data structures, the transaction information such that it is readily available and accessible for downstream data processing, including, but not limited to, automated extraction of transaction information, pattern recognition, automated fraud estimation, among others.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-network implemented method for generating an enhanced data structure adapted for improved resilience against falsification when providing authenticated access to an electronic resource, the method comprising:
   receiving one or more data sets representing transaction data of a transaction, from one or more data stores associated with a point of sale computing device, the transaction data including at least a transaction ID;
   processing the one or more data sets to extract the transaction data and to generate one or more associations between the transaction data, a merchant identifier corresponding with the point of sale computing device and one or more financial statement records stored at a financial institution computing system;
   populating the enhanced data structure storing the one or more financial statement records enhanced with the transaction data based on the one or more generated associations between the transaction data and the one or more financial statement records, the enhanced data structure transformed to include additional data fields having both at least a timestamp field and an encryption field complementary between the enhanced data structure and a physical receipt;
   generating, by a user device interfacing with a transaction platform through electric communication, a signal indicative of a user request to access the electronic resource using the enhanced data structure, at least a portion of the enhanced data structure embedded in the signal, and the enhanced data structure includes data representing at least one itemized transaction from the transaction and a corresponding timestamp data value from the timestamp field;
   receiving, by the financial institution computing system, the signal indicative of the user request to access the electronic resource;
   responsive to the received signal being received within a duration of time following the timestamp data value, generating, by the user device or the financial institution computing system, an interface element for presenting one or more security questions at the user device, the one or more security questions being generated based on the at least one itemized transaction from the electronic receipt, wherein the electronic receipt comprising the itemized transaction is part of the electronic resource requested in the user request; and
   responsive to determining that a correct response to at least one of the one or more security questions is received, granting, by the financial institution computing system, access to the electronic resource.

2. The method of claim 1, comprising responsive to the received signal indicative of a request to view the electronic receipt, automatically generating: the electronic receipt based on the transaction ID and the enhanced data structure, and an electronic command for a display of the user device to render presentation of the electronic receipt.

3. The method of claim 2, comprising populating the enhanced data structure with merchant formatting preferences, and wherein generating of the electronic receipt comprises traversing the enhanced data structure and configuring visual presentment in accordance with the merchant formatting preferences.

4. The method of claim 3, wherein the merchant formatting preferences comprise at least one of: associated branding images, visual element sizing, and visual element positioning.

5. The method of claim 2, comprising populating the enhanced data structure with user formatting preferences, and wherein generating of the electronic receipt comprises traversing the enhanced data structure and configuring visual presentment in accordance with the user formatting preferences.

6. The method of claim 1, comprising generating the one or more security questions for authentication of the user based at least on the enhanced data structure and the transaction data, wherein the one or more security questions comprises a question regarding an quantity of items in the itemized transaction in the electronic receipt.

7. A computer system for generating an enhanced data structure adapted for improved resilience against falsification when providing authenticated access to an electronic resource, the system comprising a processor and a non-transitory computer-readable medium having machine readable instructions stored thereon, the instructions, when executed, configures the processor to:

receive one or more data sets representing transaction data of a transaction, from one or more data stores associated with a point of sale computing device, the transaction data including at least a transaction ID;

process the one or more data sets to extract the transaction data and to generate one or more associations between the transaction data, a merchant identifier corresponding with the point of sale computing device and one or more financial statement records stored on a data storage on computing system;

populate the enhanced data structure storing the one or more financial statement records enhanced with the transaction data based on the one or more generated associations between the transaction data and the one or more financial statement records, the enhanced data structure transformed to include additional data fields having both at least a timestamp field and an encryption field complementary between the enhanced data structure and a physical security feature embedded on a physical receipt;

receive, from a user device interfacing with a transaction platform through electric communication, a signal indicative of a user request to access the electronic resource using the enhanced data structure, the enhanced data structure comprising data representing at least one itemized transaction from the transaction and a corresponding timestamp data value from the timestamp field; the signal being generated by the user device, and at least a portion of the enhanced data structure is embedded in the signal;

responsive to the received signal being received within a duration of time following the timestamp data value, generate an interface element for presenting one or more security questions at the user device, the one or more security questions being generated based on the at least one itemized transaction from the electronic receipt, wherein the electronic receipt comprising the itemized transaction is part of the electronic resource requested in the user request; and responsive to determining that a correct response to at least one of the one or more security questions is received, grant access to the electronic resource.

8. The system of claim 7, wherein the processor is configured to: responsive to the received signal indicative of a request to view the electronic receipt, automatically generate: the electronic receipt based on the transaction ID and the enhanced data structure, and an electronic command for a display of the user device to render presentation of the electronic receipt.

9. The system of claim 8, wherein the processor is configured to populate the enhanced data structure with merchant formatting preferences, and wherein generating of the electronic receipt comprises traversing the enhanced data structure and configuring visual presentment in accordance with the merchant formatting preferences.

10. The system of claim 9, wherein the processor is configured to populate the enhanced data structure with user formatting preferences, and wherein the generating of the electronic receipt comprises traversing the enhanced data structure and configuring visual presentment in accordance with the user formatting preferences.

11. The system of claim 9, wherein the merchant formatting preferences comprise at least one of: associated branding images, visual element sizing, and visual element positioning.

12. The system of claim 8, wherein the processor is configured to generate the one or more security questions for authentication of the user based at least on the enhanced data structure and the transaction data, wherein the one or more security questions comprises a question regarding an quantity of items in the itemized transaction in the electronic receipt.

13. The method of claim 1, wherein at least one of the one or more security questions is generated only when a period between a transaction timestamp of the transaction and a current system timestamp is within a specified time period.

14. The system of claim 7, wherein at least one of the one or more security questions is generated only when a period between a transaction timestamp of the transaction and a current system timestamp is within a specified time period.

15. The system of claim 7, further comprising a smart printer that is configured to generate the physical receipt with the embedded physical security feature.

16. The system of claim 15, wherein the signal indicative of a user request to access the electronic resource is generated based on a scan by the user's device of the embedded physical security feature.

17. The system of claim 16, wherein the embedded physical security feature is physically embedded based on the encryption field of the enhanced data structure.

18. The method of claim 1, wherein the embedded physical security feature is physically embedded based on the encryption field of the enhanced data structure by a smart printer.

19. The method of claim 18, wherein the signal indicative of a user request to access the electronic resource is generated based on a scan by the user's device of the embedded physical security feature.

20. A non-transitory computer readable medium, storing machine interpretable instructions, which when executed by a processor, cause the processor to perform a computer-network implemented method for generating an enhanced data structure adapted for improved resilience against falsification when providing authenticated access to an electronic resource, the method comprising:

receiving one or more data sets representing transaction data of a transaction, from one or more data stores associated with a point of sale computing device, the transaction data including at least a transaction ID;

processing the one or more data sets to extract the transaction data and to generate one or more associations between the transaction data, a merchant identifier corresponding with the point of sale computing device and one or more financial statement records stored at a financial institution computing system;

populating the enhanced data structure storing the one or more financial statement records enhanced with the transaction data based on the one or more generated associations between the transaction data and the one or more financial statement records, the enhanced data structure transformed to include additional data fields having both at least a timestamp field and an encryption field complementary between the enhanced data structure and a physical receipt; the signal being generated by the user device, and at least a portion of the enhanced data structure is embedded in the signal;

receiving, from a user device interfacing with a transaction platform through electric communication, a signal indicative of a user request to access the electronic resource using the enhanced data structure, the enhanced data structure comprising data representing at least one itemized transaction from the transaction and a corresponding timestamp data value from the timestamp field;

responsive to the received signal being received within a duration of time following the timestamp data value, generating an interface element for presenting one or more security questions at the user device, the one or more security questions being generated based on the at least one itemized transaction from the electronic receipt, wherein the electronic receipt comprising the itemized transaction is part of the electronic resource requested in the user request; and responsive to determining that a correct response to at least one of the one or more security questions is received, granting access to the electronic resource.

* * * * *